US006901255B2

(12) United States Patent
Shostak

(10) Patent No.: US 6,901,255 B2
(45) Date of Patent: May 31, 2005

(54) VOICE-CONTROLLED WIRELESS COMMUNICATIONS SYSTEM AND METHOD

(75) Inventor: Robert Shostak, Portola Valley, CA (US)

(73) Assignee: Vocera Communications Inc., Cupertino, CA (US)

( * ) Notice: Subject to any disclaimer, the term of this patent is extended or adjusted under 35 U.S.C. 154(b) by 121 days.

(21) Appl. No.: 09/947,235

(22) Filed: Sep. 5, 2001

(65) Prior Publication Data

US 2003/0045279 A1 Mar. 6, 2003

(51) Int. Cl.[7] .............................................. H04Q 7/20
(52) U.S. Cl. ...................... 455/422.1; 455/563; 455/564
(58) Field of Search ........................... 455/422.1, 426.1, 455/90.3, 575.1, 550.1, 563, 564, 566, 41.2, 556.1, 456.1, 422, 426, 90, 575, 550, 41, 556, 456

(56) References Cited

U.S. PATENT DOCUMENTS

| | | | |
|---|---|---|---|
| 5,515,426 A | * | 5/1996 | Yacenda et al. ....... 379/201.07 |
| 5,819,183 A | * | 10/1998 | Voroba et al. .............. 455/570 |
| 5,936,539 A | | 8/1999 | Fuchs .......................... 340/3.3 |
| 6,009,333 A | | 12/1999 | Chaco ..................... 455/456.5 |
| 6,049,710 A | * | 4/2000 | Nilsson ...................... 455/409 |
| 6,150,951 A | | 11/2000 | Olejniczak .................. 340/2.8 |
| 6,215,992 B1 | | 4/2001 | Howell et al. ........... 455/412.1 |
| 6,344,794 B1 | | 2/2002 | Ulrich et al. .......... 340/539.16 |
| 6,359,711 B1 | | 3/2002 | Cole et al. .................... 398/58 |
| 6,539,393 B1 | | 3/2003 | Kabala ....................... 707/102 |

OTHER PUBLICATIONS

Written Opinion dated Jul. 15, 2003 corresponding to PCT/US02/28096.

* cited by examiner

*Primary Examiner*—Lee Nguyen
*Assistant Examiner*—L. West
(74) *Attorney, Agent, or Firm*—Gray Cary Ware & Freidenrich LLP

(57) ABSTRACT

A wireless communication system has a central computer, one or more wireless access points and one or more personal badges that communicate wirelessly with the one or more wireless access points. The badges provide the user with a communications device that permits the user to initiate telephone calls and conferences, receive telephone calls, receive pages and be located within a particular environment.

27 Claims, 7 Drawing Sheets

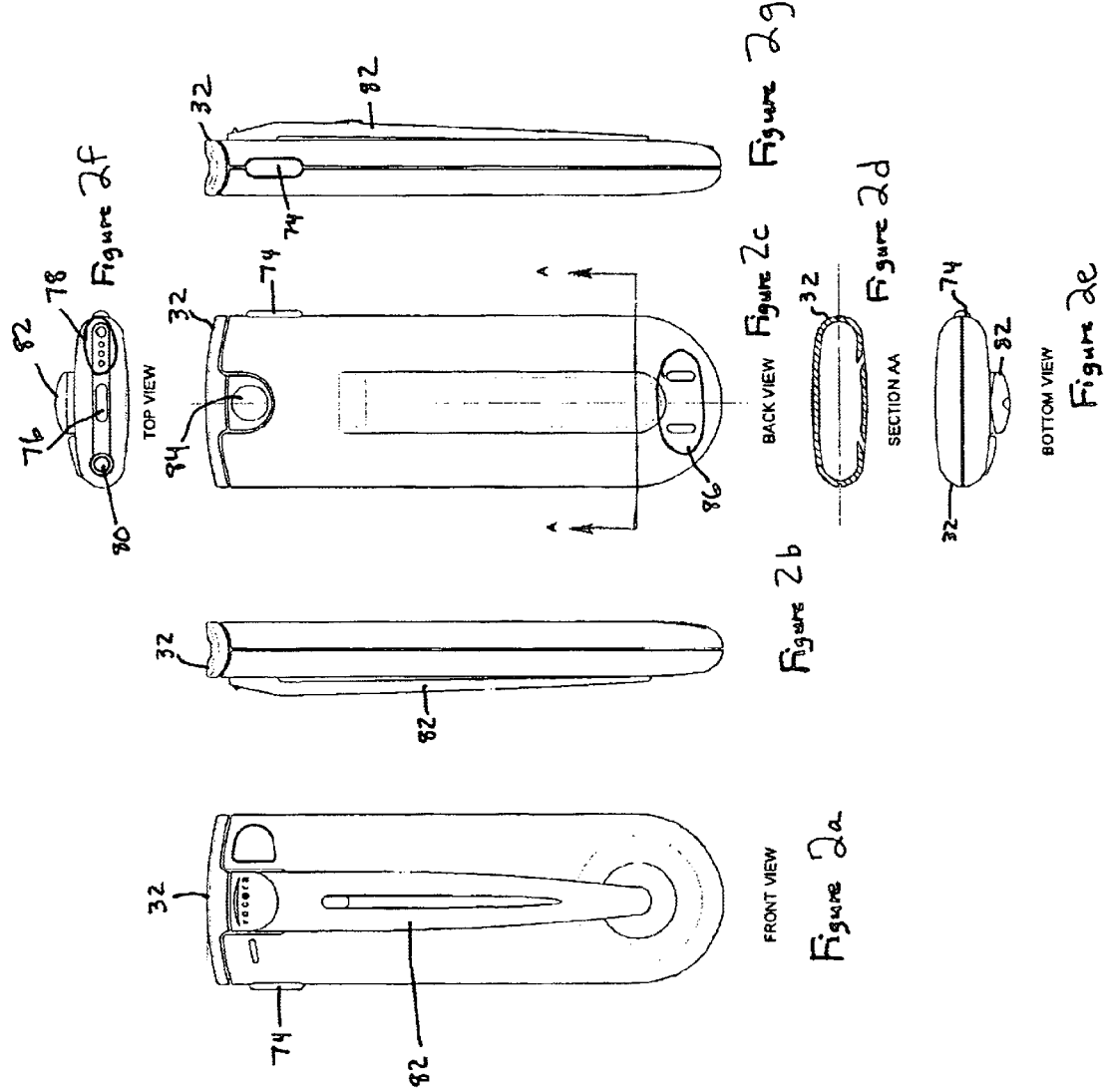

SECTION BB

FRONT VIEW

VOICE-CONTROLLED WIRELESS COMMUNICATIONS SYSTEM AND METHOD

BACKGROUND OF THE INVENTION

This invention relates generally to a system and method for providing wireless communications between individuals and in particular to a system and method that uses lightweight wireless devices that communicate with one ore more access points which in turn connect to a typical communications/computer network.

Various different wireless communication devices are well known and form a large part of our everyday lives. Examples of the well known wireless communication devices include cellular phones from various manufacturers, wireless e-mail systems, such as the Research in Motion (RIM) wireless e-mail devices that include personal information management features and capabilities, pages and other wireless access devices, such as Palm-type handheld devices that permit e-mail or Internet access.

These well known wireless communication devices provide an expanding range of capabilities. For example, when originally introduced, cellular phones provided only wireless telephone access and the clarity of the cellular phone calls was not clear. Recently, the next generation of cellular phones were introduced (2 G handsets) that provided limited Internet access so that, for example, a user may browse the World Wide Web as one might do with a typical desktop computer. The level of access, however, was very limited and unsatisfactory. These cellular phones typically provided some browsing capability, but nothing else due to various limitations including small display screen size and limited bandwidth connections. Recently, the next generation of cellular phones (2.5 G and 3 G handsets) are being introduced which allegedly will provide greater bandwidth connections that will enable the same level of functionality as is provided to a desktop computer.

Thus, these devices permit the integration of telephony functions with the functions of a web browser. Even the smallest cellular phones, however, are still fairly bulky and difficult to have available at all times, such as clipped to the shirt pocket of the user. The cellular phones also still do not have reliable communications since the footprint of the cells for the cellular still do not have reliable communications since the footprint of the cells for the cellular phones is still being expanded to provide better coverage. However, none of these systems provide wireless, lightweight communications system that is voice activated and driven. Some known cellular phones provide some limited voice-recognition capability, such as to dial a phone number based on a name of a person, but do not provide a wide breadth of voice-activated functions in small, lightweight package. Thus, it is desirable to provide a voice-activated and driven wireless communications system. It would be desirable to provide a lightweight, highly portable user device that permits the user to interact with the system.

Most current wireless communication devices are not easy to use hands-free devices so that they, therefore, require the user to use his hands to hold and operate the device. Some cellular phones provide hands free units that permit the user to talk on the cellular phone without having to hold the cellular phone during the conversation. However, even with the hands free unit, the user must still dial the phone number or speak the phone number to initiate the call. Typically, to answer a call, the user must press a button.

Thus, it is desirable to provide a voice-controlled wireless communications system that overcomes the limitations and drawbacks of typical wireless systems and it is to this end that the present invention is directed.

SUMMARY OF THE INVENTION

A voice-controlled wireless communications system is provided. The system may comprise a small, portable, lightweight user device for each user, one or more access points with which each user device communicates, and a central computer system that controls the communications wherein the central computer and the one or more access points are connected together by a typical computer/communications network, such as a local area network (LAN), a wide area network (WAN) or another other similar network. In a preferred embodiment, the system may comprise a badge for each user, one or more access points that are spaced appropriately and one or more server computers that control the communications. In more detail, each badge is a battery powered transceiver that is capable of communicating with an adjacent access point in order to perform various different desirable functions, including calling another user, calling an outside person, receiving a call from a user or third party, determining the location of a user of the system, configuring the communications system, receiving a page from a third party and many others that are described in more detail below. Each badge has very limited computing power so that the bulk of the processing to execute the one or more commands of the user are implemented by the server and the badge operates as an access device that permits the user to access the functions and capabilities of the server as described below. Each access point has some limited communications range and can handle some predetermined number of active badges (an active badge is a badge that is currently actively engaged in a communication with the server or a third party). Thus, for a predetermined area, such as a office building or office complex, there are a plurality of access points that are spaced apart from each other so that all locations in the entire building/complex are within range of at least one access point. To permit handoff between the different access points, the coverage of each access point may overlap the coverage of another access point so that the communications session of a badge that is moving between coverage of different access points is not dropped. Since the badges are lightweight and do not have sufficient computer power to perform various functions, the server performs those functions, such as voice recognition and executing the various desirable functions of the wireless communications system in accordance with the invention.

Now, to briefly explain the operation of the system, an example of the execution of one command will be described. For example, to place a call to a third party or another user of the wireless communications system, the user may activate his badge and may receive a prompt indicating that the server is ready to handle the user's requests. The user may then say a voice command, such as "Call Rob Shostak", into the badge that records the voice command in digital form and communicates the digital data corresponding to the voice command to the server through the access point. The server may then interpret the voice command. Once the voice command is interpreted, the server may execute the appropriate function in order to set up a call between the badge user and Rob. For example, the server may look up Rob in its user database to determine if Rob is a user of the system and has a badge. If Rob is a user, then the server will attempt to locate Rob and then set up a badge to badge call. If Rob is not a user of the system, then the server will establish a communications session with Rob using Rob's telephone number and then hand over the communications session to the badge. When the call is established between the badge user and Rob, the communications path is between the badge, through the access point, the server, and the PBX, to Rob.

Thus, in accordance with the invention, a wireless communications system is provided. The wireless communications system comprises a central computer, one or more wireless access points connected to the central computer by a computer network wherein each access point has a coverage area, and a badge that communicate using a wireless protocol with one of the wireless access points that the badge is within the coverage area of, the badge further comprising a microphone that receives voice commands and spoken words from a user and a speaker that generates audible signals heard by the user. The system permits a telephone call to be initiated by a voice command from the user into the microphone of the badge and the telephone call is carried out using the microphone and speaker of the badge.

In accordance with another aspect of the invention, a wireless communications unit for hands-free communication with a wireless communications system is provided. The unit comprises a central processing unit that controls the operations of the unit, a microphone connected to the central processing unit that receives voice commands and spoken words from a user and a speaker connected to the central processing unit that generates audible signals heard by the user. The unit further comprises a wireless transceiver connected to the central processing unit that communicates with the wireless communication system using a wireless protocol, and wherein a telephone call is initiated by a voice command from the user into the microphone of the unit and the telephone call is carried out using the microphone and speaker of the unit.

In accordance with yet another aspect of the invention, a method for locating a user of a wireless communications system wherein the wireless communications system has a central computer connected to one or more access points which communicate wirelessly with one or more badges associated with a user is provided. The method comprises receiving a request to locate a particular user of the wireless communications system, determining the access point currently being used for communications by the badge of the particular user, and generating a location indicator for the particular user wherein the location indicator is the name and location of the access point being used by the particular user.

BRIEF DESCRIPTION OF THE DRAWINGS

FIGS. 2a–2g illustrate a first embodiment of the communications badge in accordance with the invention;

DETAILED DESCRIPTION OF A PREFERRED EMBODIMENT

The invention is particularly applicable to a voice-controlled wireless communications system that uses Bluetooth or IEEE 802.11 as a communications protocol and a Ethernet communications/computer network and it is in this context that the invention will be described. It will be appreciated, however, that the voice-controlled wireless communications system in accordance with the invention has greater utility since it can be implemented using various different communication protocols and various different computer networks.

Figure 1:
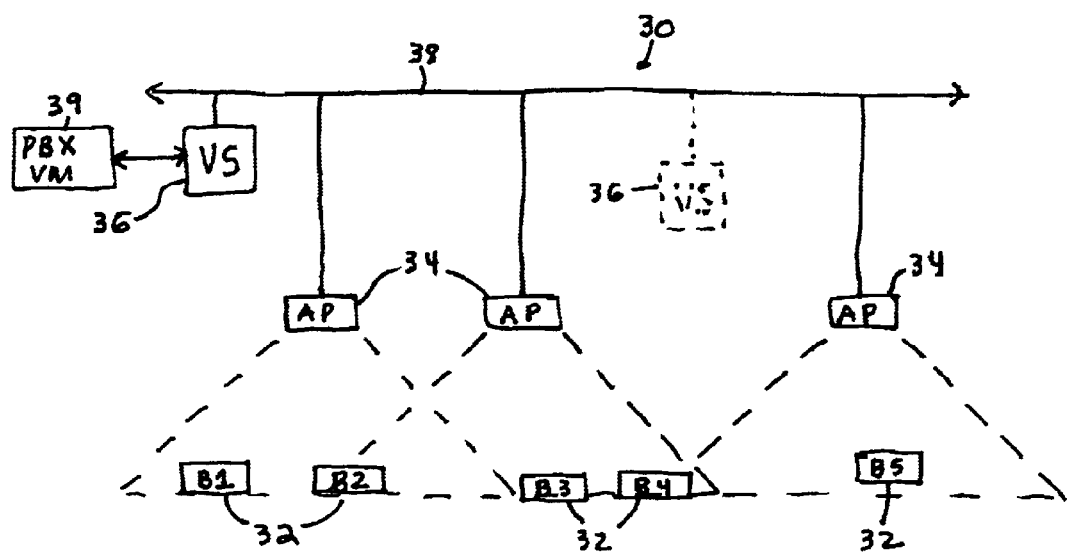
FIG. 1 illustrates an example of a preferred embodiment of the voice-controlled wireless communications system in accordance with the invention.

FIG. 1 illustrates an example of a preferred embodiment of the voice-controlled wireless communications system 30 in accordance with the invention. In particular, the system comprises a plurality of wireless user badges (B1–B6 in this example) 32, one or more wireless access points (AP) 34 and one or more central computers (VS) 36, such as a server computer, as shown. In this figure, a local area network wireless communications system is shown that permits communication between badges in the same building wherein the access points 34 and the server 36 are connected to each other and communicate with each other over a communications/computer network 38 which may be a local area Ethernet network. The voice-controlled wireless communications system, however, is not limited to being implemented using a LAN since it may also be implemented any other type of computer network. For example, for a large company with multiple buildings, a company wide voice-controlled wireless communications system may be provided wherein the building may be interconnected using a wide area network (WAN), there may be a central computer 36 located at each building which communicates with other central computers over the WAN, and each building may have a LAN with a central computer 36, one or more access points 34 and a plurality of badges 32. In a preferred embodiment, the computer network may be an Ethernet based network, the central computer 36 may be a typical server computer with additional features described below, each access point 34 may be a wireless access point that uses a particular wireless protocol, such as Bluetooth or the IEEE 802.11 standard and the wireless badges 32 are capable of communicating with the access points using the particular protocol. Thus, if the access points are implemented using the Bluetooth protocol, then the badges will have Bluetooth transceivers or if the access points are implemented using the IEEE 802.11 standard, then the badges will have 802.11 compliant transceivers.

Returning to the system shown in FIG. 1, a voice-controlled wireless communications system is shown that has a primary central computer 36 and a backup central computer (shown in phantom) that are both connected to the computer network 38. Each central computer 36 may also be connected to a telephone system 39, such as the private branch exchange system (PBX) and voicemail (VM) system shown, that permits the server to set up, manage and take down communications sessions between a user of the system that has a badge and a third party. Each access point 34 is also connected to the computer network 38 and communicates with the central computers 36 over the computer network. The access points 34 each have a limited range of operation/coverage 40, known as a network neighborhood, as shown. To permit handoff between access points as a person with a badge moves between different network neighborhoods, the network neighborhoods may preferably overlap to permit handoff without dropping a communications session. The access points may communicate with each badge 32 using a wireless protocol, such as Bluetooth or the IEEE 802.11 standard. In general, each access point is capable of handling some predetermined number of active badges (e.g., badges that are actively communicating with the central computer or actively engaged in a call with someone) so that more than one badge may be needed in a particular high density area with multiple badges. Each badge 32 is a small, lightweight, voice-controlled, wireless device that is capable of communicating with an access point. Each badge is preferable powered by a rechargeable battery. In general, each badge is an access device to the voice-controlled wireless communications system, but does not perform much of the actual processing since the processing power of each badge is relatively small. Thus, each badge will communicate with the central computer 36 through an adjacent access point in order to implement the desired wireless communication functions that are described in more detail below.

In operation, a user that wants to initiate a wireless communications function may activate his/her badge in some manner. The activation causes an adjacent access point (where the badge is within the network neighborhood of the access point) to establish a communications session with the particular badge. The user is notified that activation is complete and then speaks his command which is received by the badge using its microphone and converted into digital data. The based may then communicate the digital command data to the access point which in turn sends the digital command data to the central computer 36 over the computer network. The server may then analyze the digital command data in order to determine the command issued by the user, such as "Where is Paul Barsely". If the central computer is able to properly identify the command, then it will execute the appropriate instructions to perform the commanded operation. If the central computer cannot properly interpret the command, it may request the user to try the command again. In this manner, the user is able, using only his voice, to perform various wireless communication functions wherein the central computer implements most of the functions. Now, the badge 32 will be described in more detail.

Figure 3I:
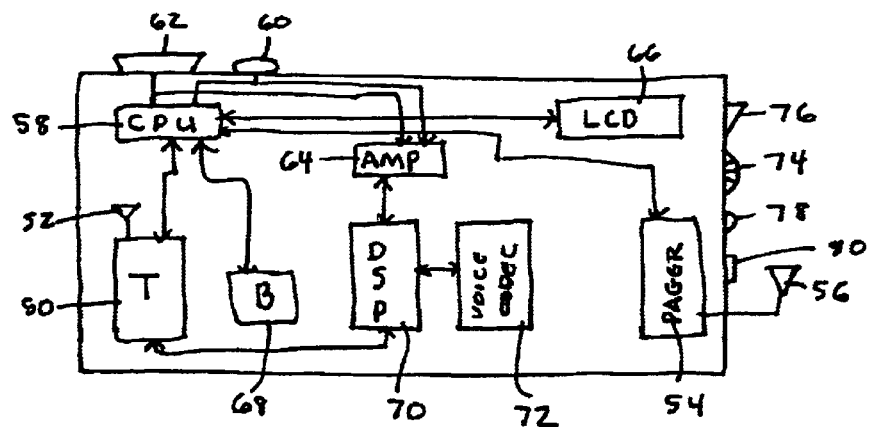
FIG. 3i is a block diagram illustrating the hardware components of the communications badge in accordance with the invention.

FIGS. 2a–2g illustrate a first embodiment of the communications badge 32 in accordance with the invention, FIGS. 3a–3h illustrate a preferred embodiment of the communications badge in accordance with the invention and FIG. 3i is a block diagram illustrating the hardware components of the communications badge in accordance with the invention. Before describing the details of the badge or the different embodiments, a general overview of the badge and its operation will be provided. Each badge is a portable, battery-powered, lightweight, wireless device that serves as the primary communications endpoints of the system. The badges support hands-free, near full duplex voice communications using a small microphone (situated near the top of the badge as described below) and a speaker (located near the bottom of the badge as described below). In addition to the wireless communications, each badge is preferably capable of receiving text pages (using a pager receiver as described below) and may include a display unit (as described below) to, among other things, permit reading of the text pages.

Each badge is only capable of voice communications when it is within the network neighborhood of any access point. The typical range of a wireless access point is approximately 35 meters for an indoor access point and approximately 100 meters for an outdoor access point. Thus, when the badge is not within the range of any access point, voice commands do not work. However, the badge may still be used as a one-way text pager anywhere within the coverage area of a global pager service network.

The badges are sufficiently small and lightweight enough so that the badge may be clipped onto a shirt pocket of the user, may be worn on a lanyard around the neck of a user or carried is a holster similar to cellular phone. In a typical environment with typical noise levels, hands-free operation using voice commands requires the badge to be situated approximately 0.5 meters from the mouth of the user so that the voice commands may be understood by the central computer. Thus, if the badge is carried in a holster, it may need to be removed from the holster and brought closer to the user's mouth for voice command, hands-free operation. For a semi-private conversation or operation in a loud environment with high noise levels, the badge may be inverted (so that the speaker is near the user's ear and the microphone is near the user's mouth) similar to a typical telephone. Optionally, a headphone jack may be provided on the badge. The badge may also include a clip (as described below) that may be used to clip the badge onto a shirt or shirt pocket or may be used to hold a corporate security badge.

The badges may be powered by a renewable energy source, such as a replaceable, rechargeable lithium polymer battery, that attaches to the back of the badge. The battery may be needed to be recharged each day for voice operation, but it may last longer if the badge is used for only text functions. The invention, however, is not limited to any particular energy source and any renewable energy source may be used. The badge may include a charging adapter as an accessory for recharging the renewable energy source and the charging adapter may be a docking station or simply a wall transformer.

Returning to FIG. 3i, a block diagram of the badge 32 is shown. Each badge may include a wireless transceiver 50 and a antennae 52 (that may be a 100 mw Bluetooth radio transceiver, an appropriate strength IEEE 802.11 transceiver or any other wireless transceiver) that is used for wireless communications with the access points 34 or with other badges as described below. Each badge may further include a pager receiver 54 and an internal antennae 56 (such as a Motorola FLEX pager receiver and antennae) that operates to receive text messages/pages within the coverage of any global paging service network. The antennae for the wireless transceiver, in a preferred embodiment, may be built into the clip of the badge. Each badge is assigned a unique wireless device address (so that it can be identified by each access point and the central computer) as well as a unique pager address, such as a FLEX pager CAP code.

Each badge may further include a central processing unit (CPU) 58 that controls the operation of the badge and each of its components including the wireless transceiver 50 and the pager receiver 54 as shown. For example, the CPU may also control a microphone 60 and a speaker 62 that are components of the badge and permit the user of the badge to communicate with the central computer 36 using voice commands and receive voice responses from the central computer 36. The microphone and speaker may also be used for voice communications with other badge users or third parties. The badge may further include an amplifier 64 that amplifies the signals provided to/from the microphone and speaker.

Figure 3H:
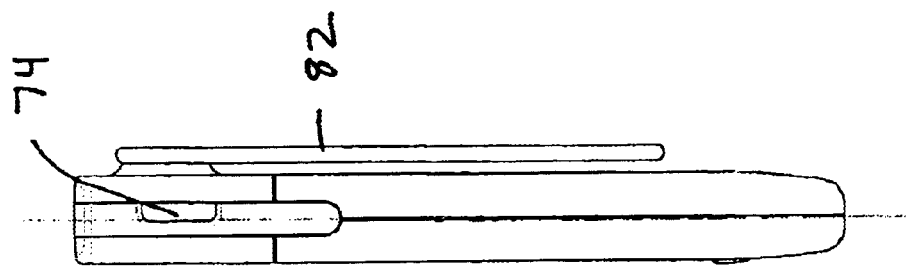
FIGS. 3a–3h illustrate a preferred embodiment of the communications badge in accordance with the invention.
Figure 3F:
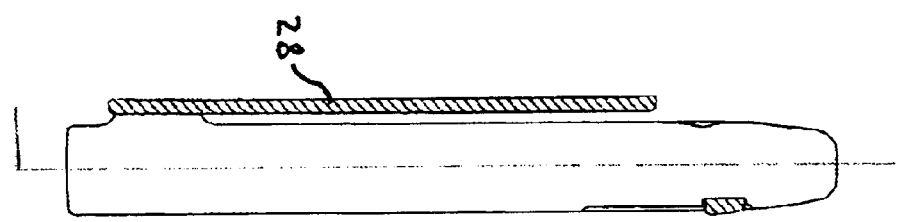
Figure 3B:
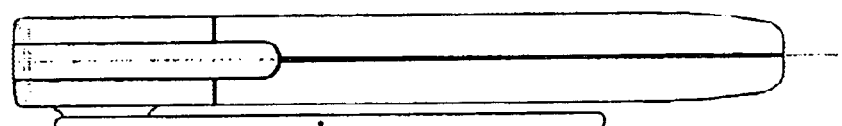
Figure 3A:
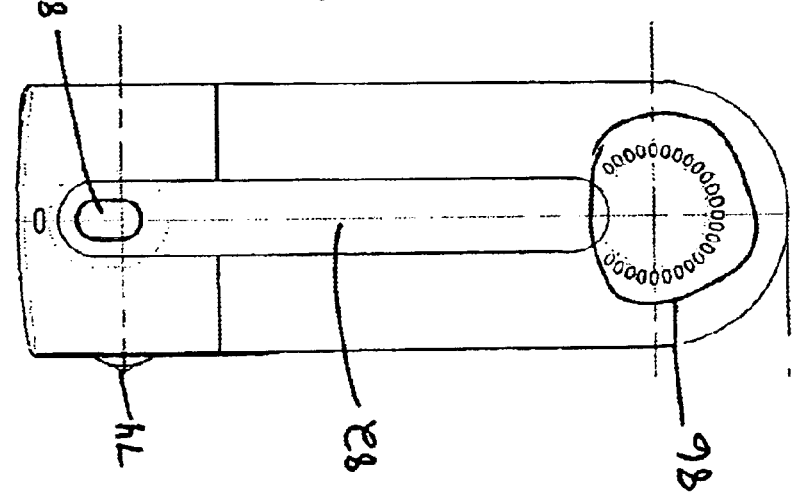
Figure 3G:
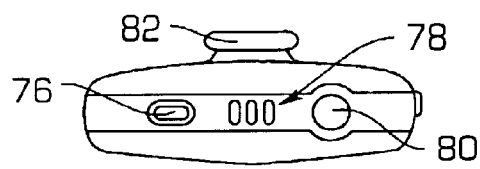
Figure 3C:
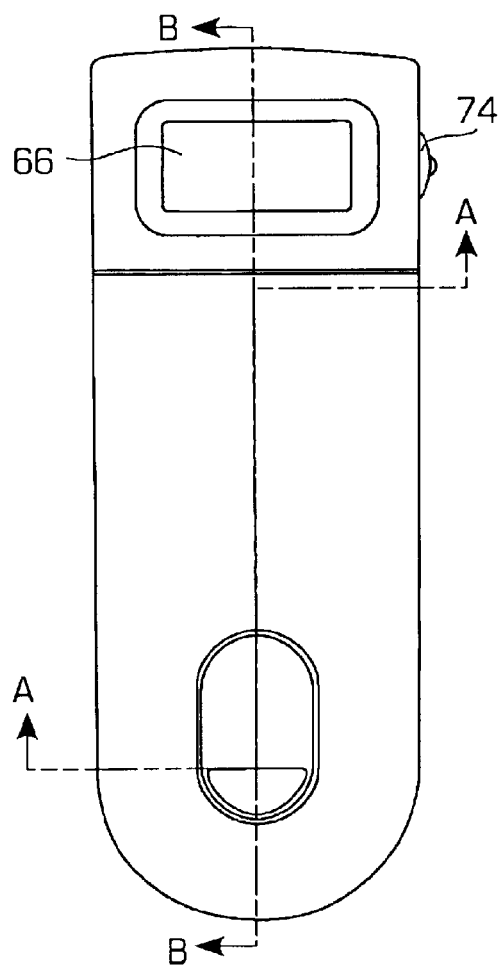
Figure 3D:
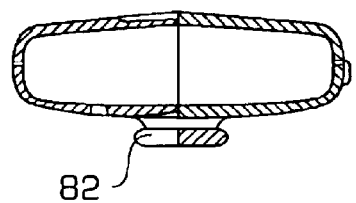
Figure 3E:
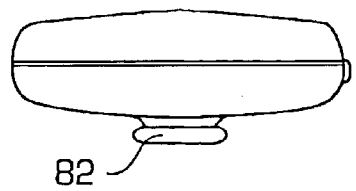

The badge 32 may also include a display device 66, such as a liquid crystal display (LCD), that may be used for various purposes, such as reviewing text messages and pagers received by the pager receiver, to permit the user to control the operation of the badge and its configuration using a control menu or to announce the origin of an incoming call. In a preferred embodiment, the display device 66 may be a monochrome dot-matrix display with approximately 32 rows and 60 columns. The display has sufficient resolution to permit four lines of approximately fourteen characters per line. In the preferred embodiment, the display device 66 may be situated on the back of the badge (as shown in FIG. 3c) to protect it from damage and so that it is not normally visible without flipping over the badge or removing it from its holster. As described above, the badge may include a renewable energy source 68, such as a removable, rechargeable batter as shown, that may include protection and charge management circuitry as is well known to prevent overcharging. The badge may further comprise a digital signal processor (DSP) 70 and an audio codec 72 for processing incoming speech from the microphone and for generating the voice signals generated by the speaker.

The badge 32 may further include an input device 74 that permits the user to control the operation of the badge and its configuration. In one embodiment, the input device may be a jog switch which is a spring-loaded compound-action switch that supports three momentary actions. In particular, the switch may be pressed inwards as an ordinary push button. The switch may also be rotated in either direction. The function of these actions depends on the context. For example, if a call is in progress, the up and down movements may control volume. When a call is not in progress, these movements may control menu and message scrolling in the display. Certain input operations may require that the switch is pushed in for more than some predetermined amount of time. In the following descriptions, it will be convenient to speak of the jog control as if it were three separate buttons for clarity. Therefore, the inward push control will be called the activate button; the other two controls will be referred to as the scroll up and scroll down buttons. Many jog operations are carried out by pressing and releasing almost immediately; we will say "press the activate button", for example, to mean press and quickly release. A few operations require holding for some predetermined period of time, such as at least half a second, before releasing. We will say "press and hold" in this case. Thus, the user interacts with the system through a combination of the jog switch and voice controls. In a preferred embodiment, the input device 74 may be a touch button location in particular location, such as on the front of the badge, that may be pushed or touched to activate the same functions and operations being activated by the jog switch.

The badge may also include an on/off switch 76 and a status indicator 78. In a preferred embodiment, the status indicator may include an LED that is capable of displaying one or more different colors to signal the operational status of the badge. For example, a slowly blinking green light indicates that the badge is within the network neighborhood and is operational while a yellow light indicates that the badge is not within a network neighborhood. The badge may further optionally include a headset jack 80 that enables the user to plug in an external microphone/speaker headset, such as an ear bud. When the external headset is plugged into the jack 80, the operation of the internal microphone and speaker is inhibited.

The wireless system must know which badge each user is wearing so that calls to the user can be properly routed. Badge assignment is the process of associating a badge with a particular user. The assignment may occur when a badge is first activated. At that time, the system prompts the user to identify himself verbally. Depending on the installation, it may also be necessary for the user to say a password provided to him by the administrator. Assuming the user is known to the system, the system will recognize the name, and will then (after a confirmation) assign the badge to the user. Once assigned, the serial number of the badge will show up on the user's console, and the badge can display a welcome greeting, when turned on, that is personalized to the user (e.g., "Hello, John"). A given badge can be assigned to at most one user at a time, and each user can be assigned only one badge at a time. A badge can later be reassigned to another user, if desired, via a voice command. Alternatively, the system administrator can explicitly set the serial number of the badge to be assigned to a user through the user console.

The bearer of the badge must typically first be registered with the system (or be registered by the administrator) before the badge can be assigned to him. In cases where visitors may be provided with a badge to be used temporarily, it may be useful for the administrator to register a few "Guest" users (the registration process only takes a moment) and assign guest badges to them. If desired, the spoken name of the guest can be entered through the user console, so that other users can hail him by name as opposed to, say, "Guest Three". As noted above, the assignment process entails that the user speak his own name so that he may be recognized by the system. The name will be recorded by the system and used for constructing a confirmation prompt when other parties call ("Finding . . . John Smith"). If the spoken name of the user is later changed in the User Console, the user will be prompted to re-speak the name the next time his badge is successfully activated. The user is similarly prompted to speak the identifying phrase ("John Smith in Sales") if one is provided.

Returning to FIGS. 2a–2g and 3a–3h, two different embodiments of the badge 32 in accordance with the invention are shown wherein the preferred embodiment of the badge 32 is shown in FIGS. 3a–3h. In the embodiment shown in FIGS. 2a–2g, the badge does not include a display device whereas the preferred embodiment shown in FIGS. 3a–3h includes the display device 66. Both of the embodiments of the badge include a clip 82, a microphone opening 84 and a speaker opening 86. Each embodiment also includes the input device 74, the on/off switch 76, the status indicator 78 and the headset jack 80 as shown. In the two embodiments shown, the status indicators 78 may be a series of LED lights. As shown in these two embodiments, the exact location of the various components on the badge may be varies without departing from the scope of the invention. Now, the wireless access points in accordance with the invention will be described in more detail.

Figure 4:
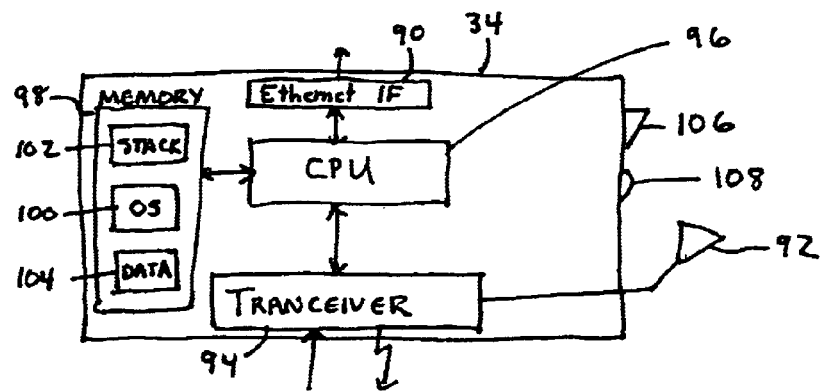
FIG. 4 is a block diagram of an exemplary access point in accordance with the invention.

FIG. 4 is a block diagram of an exemplary access point 34 in accordance with the invention. As described above, the wireless system 30 may include at least one and typically several access point units situated at various locations within the customer premises so that the network neighborhoods of the access points preferably overlap. Each access point 34 is connected to the computer network 38 as shown in FIG. 1 by a computer network interface 90. Depending on the installation, the access point may be plugged into as standard RJ45 Ethernet jack (intended typically for workstation nodes) using the Ethernet interface as shown in FIG. 4 and it may be mounted on the wall. Alternatively, the access point may be located within the area above a drop-down tiled ceiling. The power for the access point may be provided by the network cable itself (according to a new standard) or the access point may be connected to a AC source.

Each access point may include an external antennae 92 which may be supplied in several different variations, depending on the requirements of the particular installation. For example, the antenna may have directional gain and may be mounted outside the building and connected to the access point via a feed-through through a window for an outside access point. Alternatively, the antennae may be mounted adjacent to the access point inside of a building area.

In principle, each access point serves a predetermined radius. The actual radius depends on the type of wireless technology being used. For example, for a Bluetooth wireless technology, a radius of approximately 35 meters of coverage indoors and 100 meters out-of-doors may be typical. Each such area of coverage is said to be a cell. As described above, access point spacing must be such that there is sufficient cell overlap that hand-off of badges from one access point to the next can be accommodated. The spacing of access points is also a function of the anticipated conversation density. In particular, each access point is typically able to manage up to seven active badges (i.e., seven concurrent active connections). In situations where a greater number of active connections are likely within a given area, cell size can be reduced (and the number of access points increased).

Each access point further comprises a wireless transceiver 94 connected to the antennae that communicates with the badges. In one embodiment, the transceiver may be a Bluetooth transceiver while in a preferred embodiment, the transceiver may be a radio transceiver that implements the IEEE 802.11 standard. The access point may further include a central processing unit (CPU) 96 that control the transceiver and the computer network interface 90. In a preferred embodiment, the CPU may be a 32-bit RISC processor. The access point may further include memory 98 (which may include both memory chip devices as well as persistent storage devices) that stores the instructions and software used by the CPU 96 to control the operation of the access point. For example, the memory may include an operating system 100, an Ethernet-based TCP/IP stack 102 and data 104 associated with the operation of the access point. For example, the access point may temporarily buffer the voice data from a badge prior to communicating it to the central computer over the computer network. The access point may also include a control switch 106, such as an on/off switch and a status indicator 108, such as a pilot LED.

Figure 5:
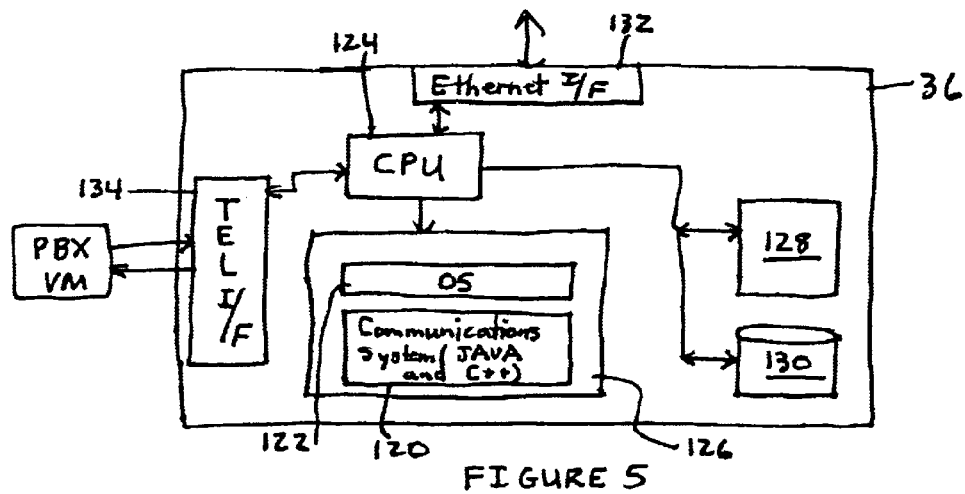
FIG. 5 is a block diagram of an exemplary server in accordance with the invention.

As is well known, each access point is factory-assigned a unique network medium access control (MAC) address and can be assigned an IP address either through a dynamic host configuration protocol (DHCP) or through wireless programming using special wireless communication system installation tools (e.g., possibly a badge with special firmware). Now, the central computer (a server in the preferred embodiment) will be described in more detail FIG. 5 is a block diagram of an exemplary server 36 in accordance with the invention. The server 36 is responsible for the overall control of the system. The server consists of a set of Java and C++ application programs 120 running on an Windows-based operating system 122 on Windows NT or Windows 2000 platforms, together with special-purpose hardware needed for telephony integration. In more detail, the server 36 may include a central processing unit (CPU) 124 and a memory 126 that stores software currently being executed by the CPU such as the operating system 122 and the JAVA and C++ applications 120 that implement the wireless communication functions of the wireless communications system. The server further comprises a persistent storage device 128, such as a hard disk drive, an optical drive, a flash memory or the like and a database 130 that stores information associated with the wireless communications system. The database stores user information, including the assignment of users to badges, speech files containing user name prompts and voice signatures, user preferences and buddy lists. It also keeps track of the whereabouts of users as they roam within the communications network. In large corporate installations, this component may interface to global employee databases maintained by the customer.

The server 36 may further include a computer network interface 132, such as the Ethernet Interface shown, that permits the server to be connected to the computer network and a telephone network interface 134 that permits the server to be integrated with a typical telephone system that may include, for example, a private exchange telephone system and a voicemail system. The server typically resides in the same location as the customer's telephone equipment so that it can interface to the PBX and the voicemail system.

Figure 6:
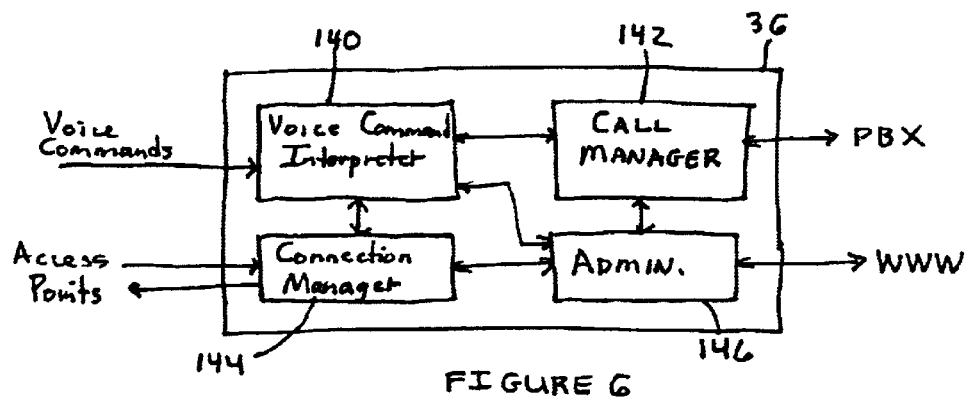
FIG. 6 illustrates more details of the server shown in FIG. 5.

FIG. 6 illustrates more details of the server 36 shown in FIG. 5. In particular, the functional blocks of the software 120 is shown in more detail. The software may include a voice command interpreter 140, a call manager 142, a connection manager 144 and an administrator 146. The voice command interpreter 140 may be a component that includes a speech engine, such as the commercially available Nuance speech engine, is built onto the speech engine and has responsibility for interpreting and executing voice-based commands from both badges and externally initiated calls coming in from the public switched telephone network (PSTN). The call manager 142 has responsibility for the set-up and the breakdown of two-party and multi-party calls and maintaining status information associated with these calls and it connected to the PSTN or PBX. The connection manager 144 is the component that is responsible for managing access points and the connections between badges and access points so it is connected to the access points. It is also supports hand-off from one access point to another as a badge roams about the network. The administrator module 146 supports administrator-level and user-level configuration and monitoring of the system through a web browser interface as shown. The telephony integration component may include hardware and software needed for the system to interoperate with the phone network. The hardware typically consists of one or more Dialogic or similar cards installed within the server machine, which might interface to a T1 trunk at the company PBX. The software will support an IVR interface that permits calls originating from the outside to be routed to the appropriate user. Now, the user console will be described in more detail.

Figure 7:
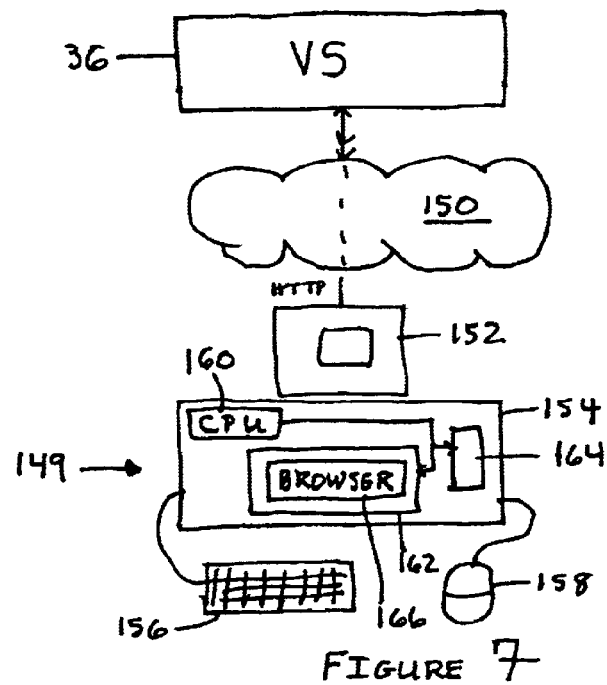
FIG. 7 illustrates an example of a user/administrator console in accordance with the invention.

FIG. 7 illustrates an example of a user/administrator console in accordance with the invention. In particular, the user console in accordance with the invention may be implemented when a computer 149, such as a personal computer, is used to access the server 36 over a computer network 150, such as the World Wide Web, that uses the typical HTTP protocol. The computer 149 may include a display unit 152, a chassis 154 and one or more input/output devices, such as a keyboard 156 and a mouse 158. In more detail, the chassis may include a central processing unit (CPU) 160, a memory 162 that stores software currently being executed by the CPU and a persistent storage device 164, such as a hard disk drive. To implement the user console functionality, a typical browser application 166 may be downloaded into the memory and executed by the CPU. The browser will permit the computer to establish a connection over a communications link, such as a DSL modem line or the like, to the server 36 using the HTTP protocol. To permit the user to view the system information, the server may generate one or more web pages that are displayed on the display unit of the computer and the user may interact with the web pages to change the information of the system.

The user console is a browser-accessible web application through which users are registered with the system, and through which various information fields, preferences, and buddy lists can be set up. The console also allows a user to retrieve saved text and voice messages and to view a call activity log. Users can access the console from anywhere (both inside and outside the customer establishment) via a login name and password. Depending on the system configuration, new users may either be allowed to self-register through the console, or may be registered only by the system administrator. In the latter case, the administrator might simply supply a user name and password, and let the user fill out preferences and other profile information. The information fields and various other settings and features that are accessible through the console will now be described.

Login Name

This is the unique identifier the user enters to gain access to the console. For example, "JSmith".

Login Password

Password may be used to gain access to the console (passwords may or may not be mandatory, depending on the system configuration). The system administrator password will always work as well.

Full Name

Includes fields for first name, last name, and middle initial.

Spoken Name

This is the full spoken name other users should say to refer to this user. For example, "Call John Smith". The system retains, as part of the user's profile, a voice audio file that records the user's spoken name in that user's own voice. This audio file is used to construct a confirmation prompt when some other party calls the user. The file is recorded as part of the badge registration process described in a later section.

Alternate Spoken Names

In the case where a user goes by different names, one or more alternate spoken names may be provided. For example, "Kathy Johnson" might be a supplied as the primary name, while "Kate Johnson", "Katie Johnson", and "Miss Johnson" might be provided as secondary names.

Identifying Phrase

In the case where two or more users have the same spoken name, a uniquely identifying phrase, such as "Jim Johnson in Sales" can be provided. In this case a caller can be asked by the system to disambiguate between "Jim Johnson in Sales", and, say, "Jim Johnson in Marketing"

E-Mail Address

This is the E-Mail address to which voice messages can be forwarded.

Desk Phone Number

This is the user's desk phone number to which incoming calls can be redirected (see Unanswered Call Options below).

Cell Phone Number

This is the user's cell phone number, to which incoming calls can be redirected (see Unanswered Call Options below).

"Away" Messages

This stores recorded messages a user can elect to have played back to the caller when not available. A particular message can be selected either through the console or via voice command.

Call Announcement Method

This setting specifies how the user's badge "rings" in the event of an incoming call. The options are:

1) Verbal announcement ("Can you speak to Johnny now?"); and/or

2) Various ringing signals (courtesy tones, ringing signals, melodies, etc.)

In either case, the LCD will display the name of the calling party (if known) and the LED will blink fast green.

Text Message Announcement Method

This setting specifies how the user's badge "rings" in the event of an incoming text message.

The options are:

1) Verbal announcement ("You've got text!")

2) Various ringing signals (courtesy tones, ringing signals, melodies, etc.); and/or 3) None In all cases, the LCD will display the name of the calling party (if known) and the LED will blink fast green.

Auto Answer Option

Ordinarily, the user must take explicit action to accept an incoming call. This is done either verbally (for example, "Accept") or by pressing the activate button. The call can also be explicitly rejected, either verbally, or by pressing and holding the activate button. If a ringing signal is used to announce a call, it can also be rejected implicitly simply by not answering.

By electing the auto answer option, the call is put through without explicit acknowledgement. If the call announcement method currently selected is verbal, the Genie simply says, "Here's Johnny!" (or some such phrase) rather than "Can you speak to Johnny?" If a ringing signal is used, only one instance of the ring is played. Auto answer is useful when a team is engaged in frequent communication, and maximal efficiency is desired.

Call Screening Options

The call screening options determine whose calls are allowed through when the user is reachable. By "allowed through", we mean only that the call is announced (see Call Announcement setting above); it may still be rejected—for example, simply by not answering. Calls that are not allowed through are handled according to the setting of the Unanswered Call options. Note that screening applies only to calls, not to pages. By default, calls from parties in the buddy list (See below) are always allowed, while all other calls are blocked. These defaults can be overridden, however, in one of three ways.

First, the user may elect the Block All Calls option, which does just that.

At the opposite extreme, he may elect Allow All Calls, which allows calls from everyone. The Block All Calls and Allow All Calls options are mutually exclusive.

Finally, he may elect to explicitly allow or block certain parties or named groups. To do so, he adds those parties to one of two lists: the Allow list, and the Block list. For example, adding Tech Support to the Allow list allows calls from any tech support person, while adding Steve to the Block list disallows calls from Steve, even if Steve is a buddy.

The Allow and Block lists can be used in combination with the Block All Calls and Allow All Calls options to achieve various effects. For example, to accept calls only from Joannie, one would elect Block All Calls, and add Joannie to the Allow list. To accept calls from everyone but people in marketing, one would elect Allow All Calls, and add the Marketing group to the Block list. Some call screening features can be controlled by voice command, and through the badge display menu. See also the Do Not Disturb command in a later section.

Buddy List

The "buddy list" is a list of parties with whom the user frequently communicates, and whose calls will be allowed through unless explicitly blocked by one of the blocking options listed above. A user's buddies each have a nickname that can (optionally) be used in voice commands in place of the buddy's full spoken name. By default, the nickname is just the buddy's first name. However, the user may specify any name he wants—for example, "Butch", "Maverick", or "Boss". Note that the nickname is private to the user, so that different users may assign a different nickname to the same person. For example, John may be on Mary's buddy list and Gina's buddy list, but may be called "Jack" by Mary, and "Johnny Baby" by Gina.

A buddy may be assigned "emergency break-in" status. If given this status, the buddy can break in to the user in the event of an emergency even if he would otherwise be blocked by virtue of one of the call screening options. In such a situation, the buddy is asked by the system whether the call is an emergency. If he answers affirmatively, he is allowed through; otherwise, the normal unanswered call procedure is followed (see Unanswered Call Options).

A call announcement option may be elected for each buddy. So for example, if a user wants calls from John to come in completely unannounced, he can elect this announcement option (none) for John. The election overrides the general Call Announcement setting.

A user's buddy list may include named groups as well as individuals. For example, putting Tech Support on your buddy list will insure that the tech support folks will always be able to reach you. Adding a group to the buddy list is tantamount to adding each member of the group to the list.

The buddy list may also include outsiders (i.e., non-users), such as external business associates, friends, or Mom. When an outsider is designated as a buddy, a phone number and e-mail address can be filled in. The phone number allows the buddy to be dialed by name ("Call Mom"), and the e-mail address allows the buddy to be sent an e-mail with a voice message attachment ("Send E-Mail to Mom"). When the outsider dials into the system and asks for a user, that outsider is prompted to identify himself ("Who may I say is calling?"). If the name he gives is that of a buddy of the user he is trying to reach, he will be treated as such, and his call will normally be allowed. The process can be abbreviated if a caller id is provided and the number matches that specified for the buddy. In this case, the system knows that Mom is calling, for example, and therefore does not need to ask.

The buddy relationship is not necessarily reciprocal; for example, the fact that the boss has added Mary to his buddy list does not imply that the boss is on Mary's buddy list. However, in many team situations, being a buddy is a two-way street. The following two options are provided for convenience in such situations:

Automatic Buddies

If Mary elects this option and John adds Mary to his buddy list, then John will automatically be added to Mary's buddy list.

Automatic Notification

If Mary elects this option and John adds Mary to his buddy list, then the next time that Mary accesses her user console, she will be notified that John has added her to his list, and can choose at that time to add John to hers (or not). Note that in the case of a team, it may be most convenient to create a named group (see Named Groups below); the name of the group could be entered into each user's buddy list.

Unanswered Call Options

These options control what happens when a call cannot get through, either because the user is currently not within the network neighborhood, or because the call is blocked or refused. At a minimum, a text message will be sent to the user's badge notifying him of the call. In addition, the user can optionally specify that the call be automatically forwarded or that a message is taken, as follows:

Forward to Desk Phone

If this option is elected, the call is redirected to the user's desk phone extension. From there, it may be picked up by the customer's voice mail system.

Forward to Voice Mail

In this case, the desk phone does not ring, but instead, the call is routed directly to the user's voice mailbox.

Record Message for Voice Mail

This option makes it possible for a voice mail message to be left without going through the tedium of interacting with the user's voice mail system. Instead, the caller is immediately prompted for a message. Afterwards, the system calls up the user's voice mail box and plays back the message "behind the scenes" without the caller's having to wait.

Forward to Cell Phone

This option is similar to "Forward to Desk Phone" option, except that the user's cell phone number is dialed instead.

Forward to Another Number

This option is similar to "Forward to Desk Phone". Requires the specification of a forwarding phone number. This option may be useful if the user will be off premises temporarily at a known location.

Quick Message

The caller is prompted for a short (no more than 10 seconds) message. As soon as the user becomes available (is within the network neighborhood, and is allowing calls from the caller), the system automatically calls the user and plays the message.

Voice-Enabled E-Mail

The caller is prompted for a message, which is then attached to an e-mail and sent to the user.

Voice-To-Text

The caller is prompted for a message, which is then transliterated to text and sent to the user, either through the network or through the pager service.

Named Groups

It is often convenient to name groups of users that can be referred to collectively. Groups often reflect organizational structure (Marketing, Tech Support, Security), but may also serve other purposes, such as to identify extemporaneous project teams. Group names may be provided as name arguments in certain voice commands, and may be entered in buddy lists.

The user console displays the groups that are currently defined for organization, and provides means by which new groups can be created, modified, and deleted. A system administration option controls whether or these operations can be performed by any user, or whether they can be performed only by the system administrator.

Locate Enabled Option

This option controls whether the user will allow himself to be located when within the network neighborhood (see description of the Where command). The user may wish to turn this off for privacy reasons (if system administration policy permits).

Auto "Who Called?" Option

If this option is elected, the user is automatically notified as to who tried unsuccessfully to reach him. The notification occurs when the user next activates his badge.

Logging and Archive Options

These options control:

Logging of Calls and Text Messages

If enabled, the console maintains a log of call and message activity. The log shows the date, time, and originator (including phone number of an outsider caller, if determinable) of each call or pager message.

Save Messages

If this option is selected, text messages will be automatically "uploaded" from the badge periodically and saved. Controls are provided in the console for viewing and deleting these archived messages.

Genie Prompt Options

When the user summons the voice recognition system (the Genie) by activating his badge, a prompt is played to signal that the Genie is listening. This option allows the user to choose from among a number of prompt options, including:

1) Verbal Prompt (such as "Vocera—how can I help you?"); and/or

2) Various courtesy tones.

Electing this option makes the voice command prompts more verbose. The verbal commands are unchanged, but the user is "babied" more.

Predefined ("Canned") Text Messages

Predefined, or "canned" messages provide a means by which a user can reply to messages or calls from other users simply by making a selection from the badge display menus. See the "Text Messaging" section for a more detailed description of this feature.

Learn Mode Option

Electing this option makes the voice command prompts more verbose. The verbal commands are unchanged, but the user is "babied" more.

Power Control Options

These may include, for example, restricted hours of operation that save battery power.

Badge Serial No.

This field shows the serial number (derived from the Bluetooth device address) of the badge currently assigned to the user, if any. The serial number is provided for informational purposes only, and can be set through the console only by the system administrator. Normally, this field is set instead through the badge registration process described below.

Pager CAP Code

This field gives the CAP Code assigned to the user. As with the Badge Serial No, this field cannot be set by the user. It will instead be set either by the system administrator, or will already have set inside the badge itself at the factory. Now, the operating states of the communications badge in accordance with the invention will be described.

Figure 8:
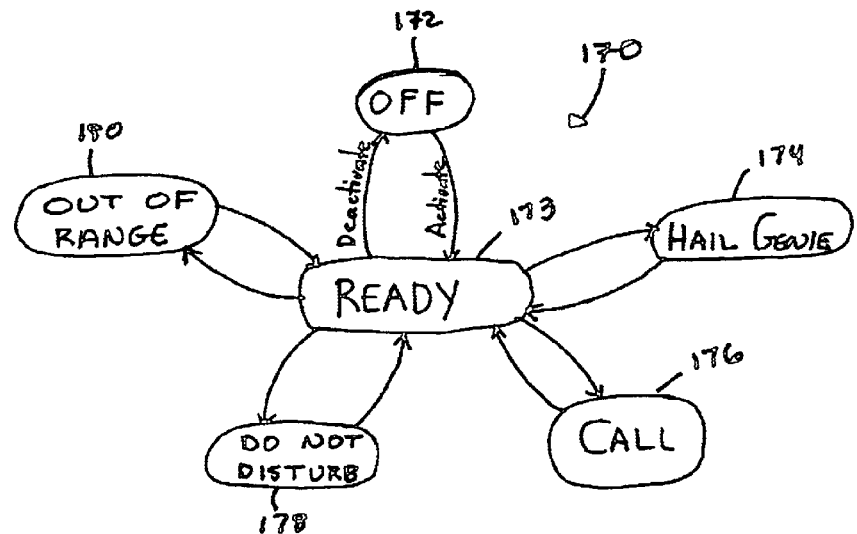
FIG. 8 is a state diagram illustrating the preferred operating states of a communications badge in accordance with the invention.

FIG. 8 is a state diagram 170 illustrating the preferred operating states of a communications badge in accordance with the invention. The operating states may include an off state 172 in which the badge is not operational and a ready state 173 in which the badge is ready to be used but in not currently being used for any purpose. The states may further include a hail genie state 174 as described below, a call state 176 as described below with reference to FIG. 10, a do not disturb state 178 as described below and an out of range state 180 when the badge is not within the network neighborhood.

To move from the off state to the ready state, the badge is activated and to move back to the off state, the badge is deactivated. When the user wishes to initiate a call or other interaction with the server 36, he/she must explicitly activate the badge by pressing the activate button. In particular, for reasons of power conservation and other resource constraints, the voice recognition server cannot be listening all the time—one cannot wake it up simply by uttering some magic word. Moreover, it is quite important that a user understand when the microphone is active and when it is not. For these reasons, explicit activation is used to initiate an interaction. A badge may, however, be activated automatically as a result of an incoming call from some other party although automatic activation requires that the badge be powered on at the time.

Upon activation, a prompt is played alerting the user to the fact that the server 36 (the "Genie") is now listening. The prompt is configurable as an option from the User Console, and may consist of a voice prompt ("Vocera. How can I help you?"), or a courtesy tone, depending on a User Console setting. In the event that activation is unsuccessful, a deactivate tone is played. Unsuccessful activation may result from one or more of a number of different circumstances. For example, the user may be outside the network neighborhood, or the controlling access point may already be at maximum capacity, or the speech server may be at maximum capacity. Once an activation prompt is played, the user can interact with the server using voice commands. The voice command menu available at this point is called the Main Menu.

No further pushbutton action is likely to be needed until the user wishes to disconnect (deactivate). This is done with a press and hold of the activate button. In accordance with the invention, activation or call acceptance is typically signaled with a simple press while deactivation or call refusal with a press and hold. Deactivation may also occur without having to explicitly press the activate button in each of the following circumstances:

In the case where a call is in progress, and all other parties to the call disconnect, the remaining party is automatically disconnected without having to press the button; or In the event that the connection is lost because the user wanders outside the network neighborhood, deactivation occurs; or If, while interacting with the Vocera server, the user utters a "Quit" command, deactivation occurs.

Deactivation is always accompanied by the sounding of a deactivate tone as a confirmation. Now, the do not disturb state will be described in more detail.

The do not disturb state may be initiated by pressing and holding the activate button when no call is in progress which automatically sets "Block All Calls" screening. This provides a quick and silent method for a user who is entering a meeting, for example, to insure that he will not be disturbed. A message is displayed on the LCD, and the LED blinks red to signal the mode. Later activation of the badge (or setting call screening options through the User Console or the badge menu system) turns off the Do Not Disturb state, and restores call screening to its former state. Now, hailing the genie will be described in more detail.

As described above, activating the badge causes the user to begin communicating to the Genie. If the conversation with the Genie results in the successful establishment of a connection with another party, the Genie bows out of the conversation so that the server 36 is free to help another user. The user may wish, however, to regain the attention of the Genie in the midst of the conversation—for example, for the purpose of conferencing in a third party.

To hail the Genie without terminating the current call, the user simply presses the activate button again. This will cause the other party or parties to be placed "on hold", and the Genie announcement prompt will be played. Once interaction with the Genie has concluded, the user rejoins the conversation in progress automatically. Now, the genie commands will be described in more detail.

Genie Commands

The design of the voice command system is such as to strike an appropriate balance between flexibility of expression, on the one hand, and predictability on the other. Another balance to be struck is that between economy of expression and ease of learning. Given that the application is used every day, elaborate dialogs and confirmation protocols for frequently used commands are to be avoided. To accommodate the learning process while retaining economy of expression, both a verbose learning mode and a less prolix high efficiency mode are supported, and are selectable from the User Console.

Command Syntax

For the most part, voice commands have a simple "verb object" structure. For example, "Call John Smith" is typical. Commands keywords for the most common commands may have synonyms. For example, instead of "Call John Smith", one could say "Get me John Smith", or "Find John Smith".

Noise Words

Certain "noise" and "hesitation" words may be used as well. One might say, for example, "Um, Vocera, please get me John Smith". Naturally, there are limits to the tolerance for variations. The system may not recognize "Where the **** is John Smith!!".

Name Arguments

In general, commands that include user names and group names require one of the spoken names registered for that user or group in the User Console. However, if the party in question is included on the buddy list of the caller, the nickname listed for that buddy may be used instead. Spoken names and buddy nicknames may not be unique. In the event of ambiguity, the Genie will ask the user which of the users he means by playing back the spoken name recorded for each user. If two users have exactly the same full name, the identifying phrase set in the User Console can be used to disambiguate.

Universal Commands

Universal commands are those that can be uttered whenever the Genie is listening. The following universals are supported:

Help—This command calls for context-sensitive help, including the possibility of interaction with a human technical support agent at the wireless communications system.

Cancel—This command cancels the current command.
Quit—The command deactivates the badge.
Emergency—This command, after confirming, calls "9-1-1".

Barge-In

"Barge-in" refers to the ability for a user to break in with a command while the Genie is playing a response, without having to wait for the prompt to complete. Barge-in will be supported to the extent possible. Now, a badge to badge communications session and then the other call states will be described in more detail.

Figure 9:
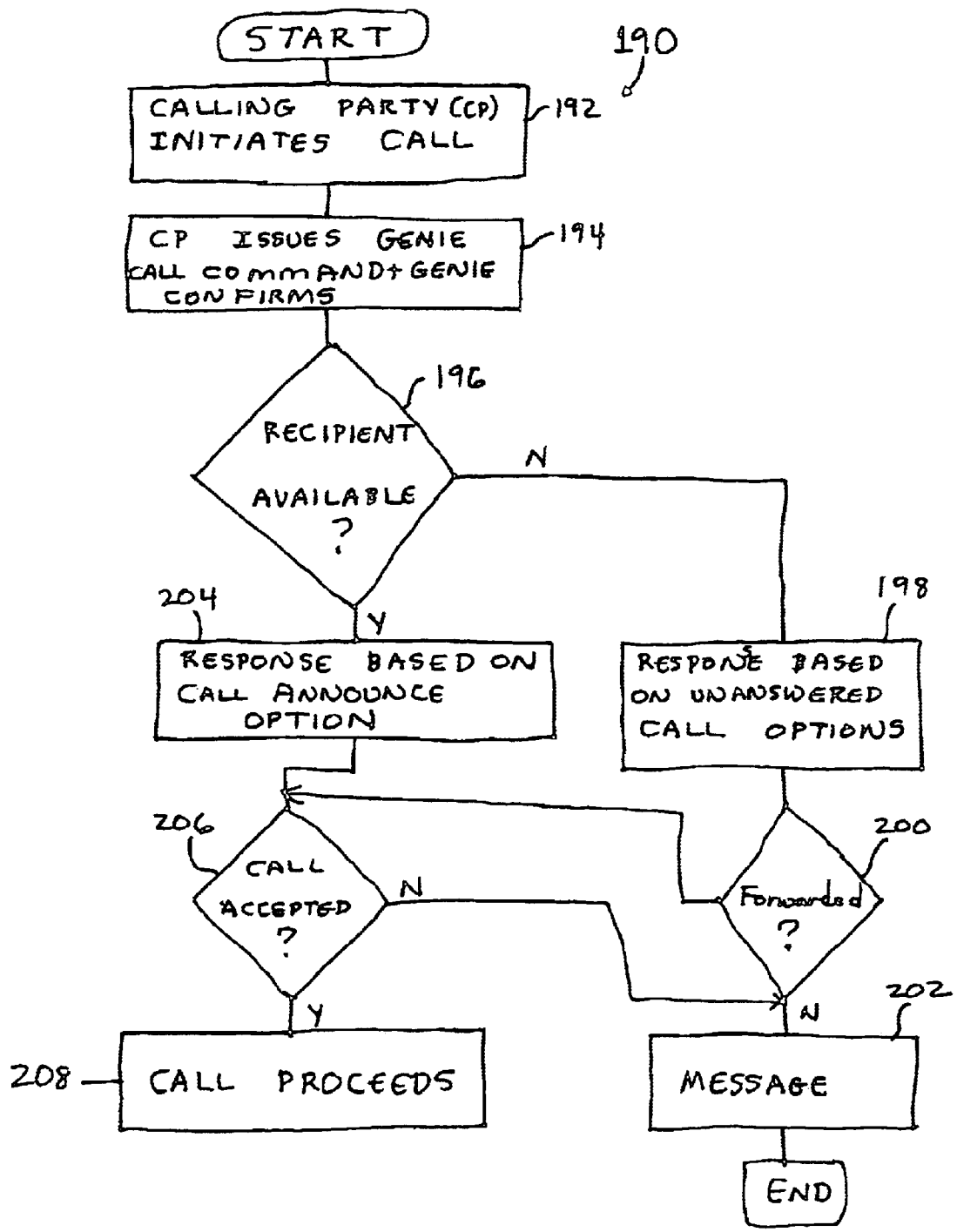
FIG. 9 is a flowchart illustrating a method for performing a badge to badge communications session in accordance with the invention.

FIG. 9 is a flowchart illustrating a method 190 for performing a badge to badge communications session in accordance with the invention. In step 192, the calling party (let's call her Mary) initiates the call by pressing the activate button to summon the Genie. Upon hearing the Genie prompt, she issues a command in step 194, such as, "Call John Smith", or "Get me John Smith", where John Smith is the spoken name of the called party. If John Smith is on the caller's buddy list, John's nickname can be used instead: "Get Jack". The Genie confirms the command by replying, "Finding John Smith . . . " wherein the "John Smith" part is played in John's own voice. If the server incorrectly recognizes John's name ("Finding Joan Smith . . . "), Mary can simply say, "Cancel" and reissue the Call command.

In step 196, the server 36 (using the user database) determines if the recipient is available. If the recipient is not available (e.g., If John is outside the network neighborhood or is currently blocking calls from Mary), the response in step 198 depends on the setting of John's Unanswered Call options. If John has specified a forwarding method (as shown in step 200), the call is automatically routed using that method; if John has specified one of the message recording options, Mary is asked whether she wants to leave a message (in step 202). Otherwise, Mary is told that John is unavailable but will be immediately notified of her call. The transaction ends, and Mary's badge is automatically deactivated.

Returning to step 196, assuming that John is currently available, and that calls from Mary are not blocked, John's badge signals an incoming call in the manner determined by his Call Announcement Method setting in step 204. If John has set the Auto Answer option, the call is put through immediately. Otherwise, he accepts or rejects the call either verbally (e.g., "Accept"), or using the activate button (press to accept, press and hold to reject). John can also reject implicitly simply by doing nothing. Finally, he may decide to reject, but send a message back to Mary ("Tell Mary . . . "). If the call is accepted in step 206, the conversation between Mary and John begins in step 208 and the Genie drops out of the loop. If either party needs Genie services during the conversation, the Genie can be hailed by pressing the activate button as described earlier. Either Mary or John can terminate the call by pressing and holding the activate button, causing both badges to be deactivated. If the call is rejected, John's badge automatically deactivates. If John used the "Tell" command to leave Mary a message, that message in step 202 is played back to Mary. What happens next on Mary's side depends on the setting of John's Unanswered Call options, as described above. Now, the one or more different call states in accordance with the invention will be described in more detail.

Figure 10:
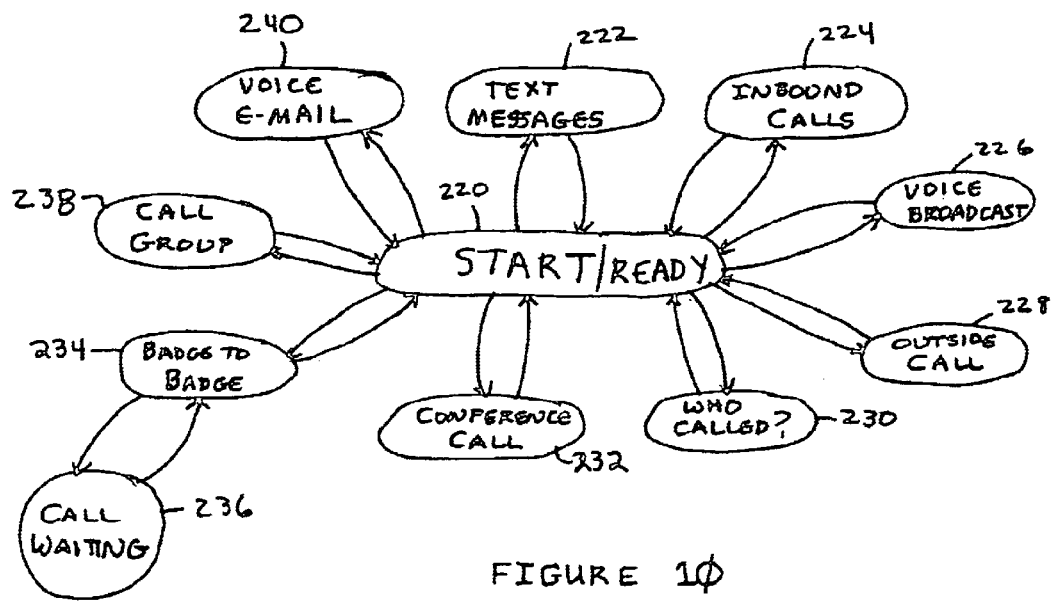
FIG. 10 is a state diagram illustrating the preferred call states of the wireless communications system.

FIG. 10 is a state diagram illustrating the preferred call states of the wireless communications system. The system supports a number of calling modes and features, including multi-party calls, on-the-fly conferencing, call waiting, message broadcast, and calls to and from the PSTN (public switched telephone network). The states may include a ready state 220 in which a call may begin, a test message state 222, an inbound call state 224, a voice broadcast state 226, an outside call state 228, a who called state 230, a conference call state 232, a badge to badge call state 234 as described above including a call waiting state 236, a call group state 238 and a voice e-mail state 240. Now, various of these call states will be described in more detail.

Conference Call State

If Mary wishes to initiate a conference call with Jim and John, she simply says, "Call Jim and John." The two parties will be called and conferenced together to create a three-party conversation. Conferences of up to four parties can be created in this way ("Call Jim, John, and Sam"). The interaction for conference calls differs from that for a straight two-party call in the following ways:

Parties that join a conference in session are alerted to that fact;

Each new party is announced with a tone, alerting the others; and

If a party is unavailable, he is simply not included; forwarding of calls to voicemail, and other Unanswered Call options are inhibited.

A conference can also be initiated by adding parties to an ongoing conversation. If for example, Mary wishes to bring Jim into her conversation with John, she hails the Genie (which automatically puts John on hold), and says, "Call Jim Jones" in the usual manner. Once she reaches Jim, she again hails the Genie and says, "Conference". The three parties are now engaged. Note that if Mary just wanted to ask Jim a question, she could disconnect after speaking to Jim (by pressing and holding the activate button), and would then be back to the original conversation.

Call Waiting State

If, in the Badge-to-Badge scenario described earlier, John is already engaged in a conversation with another party, he will be alerted to Mary's call with an audible call waiting signal. In addition, Mary's name will be displayed on the LCD, and the LED will blink fast as with any incoming call. If John wishes to accept the call from Mary, he presses the activate button. He will then be speaking to Mary, and his current call will be placed on hold. When he is done speaking with Mary, he disconnects in the usual way (by pressing and holding the activate button), and will then be back to the original call. The same thing happens if Mary explicitly disconnects. John can have Mary conferenced into his original conversation. To do so, he simply hails the Genie (by pressing the activate button as usual) and says, "Conference".

Calls to a Member of a Named Group State

It is often useful to be able to call someone by function rather than by name. For example, Mary may need Tech Support, but not know (nor care) who is currently managing the help desk—she simply wants to be able to say "Get me Tech Support". The effect is easily accomplished by defining "Tech Support" as a named group, and by designating one or more people as the members of the group. The Tech Support manager, might, for example, set up this group.

In many situations, the group might have only a single member. In this case, the group name serves as an alias for the person who is currently responsible for answering calls for the group. If the group has more than one member, the incoming call will be routed to the first person on the list who is available. In this way, alternates can back up the primary group representative.

Who called? State

The "Who called?" voice command can be used to learn of parties who tried unsuccessfully to reach the user. After she is done with a meeting, for example, Mary might hail the Genie and asked "Who called?" The Genie might reply, "John, Sam Spade, and Mom called". Note that calls that a user misses for any reason are signaled on the LCD display even when the user is currently outside the network neighborhood. The "Who called" command is a quick way to get this information without having to manipulate the display. The "Who Called?" command can be automatically executed when the user activates his badge by setting the "Auto Who Called?" option in the User Console.

Voice Message Broadcasts State

Broadcasting affords a means by which a user can send a recorded voice message to one or more recipients. Suppose, for example, that Mary wishes to leave a message for John, and for everyone on the Blowtorch Team. She hails the Genie and says, "Send a message to John and The Blowtorch Team". The Genie then prompts her for a message ("Please record a message at the beep. Press any button when done."). The system will then call each targeted user and play the message. Users that cannot be reached (because they are away from the network, or have blocked the call) are notified immediately upon becoming available, in the same manner as for the Quick Message feature (see Unanswered Call Options).

Voice E-Mail State

This feature allows a user to send an e-mail with a voice attachment to the e-mail address of another user or users (or to outsiders on the buddy list). The interaction works similarly to Voice Message Broadcasts, except that the command is "Send e-mail . . . " rather than "Send message.

Outbound Calls State

Calls can be placed through the public phone system just by substituting a phone number for a name in the Call command. For example, Mary might hail the Genie and say, "Call area code six-five-oh eight-five-one-two-two-three-four". If an outsider has been set up as a buddy, a buddy name can be provided ("Call Mom") instead. Note that unanswered calls can also be forwarded to outside numbers (see Unanswered Call options above).

Inbound Calls State

Calls can also be accepted from the public phone system. In this case, the caller dials a phone number that reaches the system inside the customer premises (perhaps an extension on the customer PBX). The caller is then played a greeting, and is prompted by the system to say the name of the user to whom he wishes to connect. If caller id is not provided, the caller is also asked to identify himself ("Who may I ask is calling") This information allows the called user to be prompted with the name of the caller, and allows the system to recognize the caller as a buddy. The call is then routed much in the same way it would were it to have been originated internally.

Remote Dial-In State

This feature makes it possible for a user to treat his cell phone, for example, as if it were a badge. The user dials the system, as in the case of inbound calls. (The number would typically be set up as a speed-dial number.) Using caller id, the system recognizes the identity of the user, and hails the Genie. The user can now interact with the Genie in the usual manner. Pressing a key on the cell phone simulates the action of the activate button.

Text Messaging State

The pager functionality of the badge makes it possible to receive text messages whether or not the target user is currently within the network neighborhood. Messages could originate in all the ways that are supported by traditional alphanumeric pagers, such as:

Via e-mail;

Through a web site (which could be the Vocera web site);

By calling up a phone number assigned by the paging service provider; and

Though an automatic equipment failure notification mechanism,

A number of other, less traditional text origination features are provided as well:

Missed Call Notifications State

When an incoming call is missed, either because the user is currently outside the network neighborhood, or has blocked or rejected a call, a text record of the missed call is sent to the badge. If the user is outside the network, the record is sent though the paging service; otherwise it is sent through the network. The record consists of the date/timestamp of the call, as well as the name or caller id (if determinable) of the caller. It is accessible through the Messages screen selectable through the badge menu system.

Predefined ("Canned") Replies State

A message replies that have been pre-specified in the User Console (e.g., "Yes", "No", "OK", "Call you later") can be originated through a badge menu selection. This feature makes it possible to respond silently to a call or text message received while in a meeting, and provides some of the functionality offered by two-way pagers. The user selects the incoming message in question from the Message List accessible from the Main badge menu, and chooses "Reply" from the pop-up menu. He is then presented with a submenu listing the various predefined responses, from which he selects one.

Voice-to-Text State

This feature permits voice messages to be transliterated to text and sent to a user's badge either through the network or through the paging service. The voice-to-Text could be implemented either completely automatically (using dictation speech recognition software) or manually using a behind-the-scenes human service. The feature is accessed through a voice command. The user would hail the Genie and say "Send Text Message". He would then be prompted for the message (much in the manner of Voice Message Broadcasts), which would then be sent out. If the Voice-to-Text option is selected in the User Console as an Unanswered Call option, a caller could be prompted automatically for a message if the target user is not available. Now, a method for locating a user of a badge in accordance with the invention will be described in more detail.

Automatic Location of Users

The system provides a way to determine whether or not a user is currently within the network neighborhood and to pinpoint his whereabouts (within the resolution of an access point) in the event that he is within the network neighborhood. To accomplish this user location, a "Locate Enabled" option must be enabled on the User Console in which the user indicates that it is acceptable to be pinpointed by the system. A system administration option may, however, be provided, that overrides the user setting in case of emergency, for example. The location ability also requires that the access points be identified with designations that will be meaningful to users—for —example, "Building C, $2^{nd}$ Floor, Left Wing". The system may include the ability for the system administrator to configured the access point designators. The system may also provide two voice location commands. One command permits the user to ask the system to determine the location of a particular user and the other command permits the user to ask the system to determine the user within a named group that is closest to a given location (e.g., I need a tech support person who is near my location). The following are examples of the use of these commands:

User: "Where is Jim Jones?"
Genie: "Jim Jones is in Building C, $2^{nd}$ Floor, Right Wing
User: "Where is Mary?"
Genie: "Mary is currently on the Santa Clara campus in the Cafeteria"
User: "Where is Mary?"
Genie: "Mary is currently off campus."
User: "Who in Tech Support is in Building C?"
Genie: "Brad Jones and Jerry Peters are in Building C"

Now, the utility of the display unit on the badge will be described in more detail. The LCD display on the back of the badge displays incoming call information, messages, and status information of various kinds. The display is manipulated through a menu system controlled by the jog switch. Through the menu system, a user can power the badge on and off, set preferences, and peruse text messages. The function of the display and the controls depends on which of several modes the badge is currently in:

Powered Off

In this mode, the unit is completely inactive, and the display is blank. Pressing the activate button at this point brings the badge back to life, displays a welcome message, "Hello, Dave", and enters Standby Mode.

Standby Mode

Standby means that the unit is powered on, but no conversation is active, and the user is not currently interacting with the menus. The display shows the Home Screen, which gives the current date and time, a battery level indication, an indication of unread page messages, and an icon showing the current wireless signal strength. If the user missed a call, the name of the caller (if known) is displayed in large font. If more than one call was missed, the name of the most recent caller is displayed. Pressing either of the up or down buttons brings up the main menu. Pressing the activate button activates the badge, while pressing and holding initiates Do Not Disturb (Block All Calls) screening.

Activated Mode

In this mode, a conversation is taking place with either the Genie or with other parties. The display shows the Home Screen, as described above. If an incoming call arrives in the midst of the conversation, the display shows the name of the new caller (if known). Pressing the scroll up and scroll down buttons in this mode adjusts the volume level correspondingly. The display shows a graphic indicating the new level momentarily. Pressing the activate button disconnects, or hails the Genie (as described in an earlier section).

Menu Mode

This mode is entered by pressing either scroll up or scroll down while in Standby Mode. Entering the mode brings up the Main Menu, a pop-up menu that occupies the right half of the screen. The menu consists of a list of selections, only one of which is highlighted (displayed in reverse video) at a time. The scroll up and scroll down buttons can be used to traverse the list, and the activate button to make a selection. Tiny scroll arrows at the right top and bottom of the screen indicate more selections above or below. If the user selects "Exit", (present in every menu) or presses and holds the activate button, the menu disappears and Standby Mode resumes. Otherwise, either (a) a submenu is presented, or (b) the menu disappears and a screen appropriate to the selection is brought up. In this latter case, the action of the scroll controls now depends on the particular screen selected. For example, in the Message List screen, these controls scroll through the list of message headers; in the Volume Control screen, they control the volume setting. In any case, the menu can almost always be regained by pressing the activate button. The menu selections presented at this point are context sensitive. If the user has made a change to a setting, for example, the menu will show Save and Cancel options. Note that the badge cannot be activated directly from Menu Mode. The user must first leave the mode.

On the other hand, incoming calls are not blocked. If an incoming call arrives, the menu state is suspended while the user entertains the call. So, for example, if the badge Call Announcement option is set to play a tone to announce incoming calls, the tone will be played, and the user can answer it as usual by pressing the activate button. The controls will behave as they normally do in Activated Mode. When the call ends, the display will return to the menu state the user was in prior to the call. Now, the commands in a preferred embodiment of the invention will be described.

Commands of the Badge

Message List

Selecting this item brings up a list of message headers. Messages include text pages as well as records of missed calls. Each header includes the following items:

An icon indicating the kind of item (text message or missed call record) and whether it has been read (for a text message) or replied to.

Date/Time Stamp

Name or caller id of originator (if known)

The user can scroll through the various headers using the up and down buttons. The currently highlighted item is shown in reverse video. He can then push the activate button to select a particular message, at which point a pop-up menu is displayed showing the following options:

Read

This selection brings up a screen that displays the full message, including header information, subject, and body. The up and down buttons scroll vertically through the text. Pressing the activate button at this point brings back the Message List, with the current message still highlighted.

Delete

This selection brings up a confirmation submenu prompting the user to confirm the deletion ("Delete" or "Cancel"). If confirmed, the message is deleted and the message list is redisplayed. Note that if a user has elected the "Save Messages" option in the User Console, the message will be "beamed up" to the server and archived whether it is deleted or not.

Reply

This selection brings up a submenu allowing the user to reply to the message with one of the Predefined Text Messages configured in the User Console. The submenu has an item for each such message; depending on the length of the message, it may show only the first several characters. Selecting one of the items brings up a confirmation submenu ("Send" or "Cancel"). Selecting either of these displays a confirm message momentarily, then returns to the Message List.

Cancel

Returns to the Main Menu.

Exit

Exits the menu system altogether.

Volume

Selecting this item brings up a screen with a graphic showing the current volume setting. The up and down button can be used to change the setting. The activate button brings up a menu with Save (if a change was made), Cancel, and Exit choices. Selecting Cancel or Save brings back the Main Menu, selecting Exit leaves the menu system. Note that when a call is in progress (Activated Mode), the up and down buttons can be used to change the volume setting.

Screening

Selecting this item brings up a submenu allowing certain call screening options to be selected, just as if they had been selected in the User Console. The submenu has choices for "Block All", "Allow All", "Allow Buddies", "Cancel", and "Exit". Selecting "Exit" leaves the menu system, any other selection returns to the Main Menu.

Off

Selecting this item powers off the badge. It can later be turned on by pressing the activate button, which sounds a confirmation tone and places it in Standby Mode.

Now, a summary of the voice commands in a preferred embodiment of the system will be described.

Summary of Voice Commands

This summary is a listing of the primary voice commands with one or more examples. Commands in the following list that are marked universal can be spoken at any time during a conversation with the Genie.

Allow—Allows calls from one or more parties.

"Allow all calls"

"Allow calls from Jack and Mary"

Block—Blocks calls from one or more parties.

"Block all calls"

"Block calls from Jack and Mary"

"Do not disturb" (same as Block all calls)

Call—Places a call to one or more parties.

"Call Mary"

"Call Mary Jones"

"Call Jack and Mary"

"Get me Mary"

"Find Mary"

Cancel (Universal)—Cancels current action.

"Cancel"

Conference—Conferences together called parties.

"Conference"

Emergency (Universal)—Dials 9-1-1

"Emergency!"

Help (Universal)—Help with the current voice command

"Help!"

Quit (Universal)—Deactivates the badge

Send Message—Broadcasts a voice message to a group

"Send message to the Blowtorch team"

"Send message to John"

Send E-Mail—Sends an e-mail with a voice message to a group

"Send e-mail to the Blowtorch team"

Tell—Leaves a message with a rejected caller

"Tell Mary I'll get back to her"

Where—Locates a user

"Where is Mary"

"Locate Mary"

Who—Locates nearest user to a location

"Who in Tech Support is in Building C?"

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A communication system comprising:
 a badge having a means for receiving an outgoing action command, a user identification, and user instructions on how to respond to incoming calls;

one or more access points that communicate with the badge by using a wireless protocol, wherein each of the access points has a predetermined coverage area; and a central computer connected to the access points, wherein the central computer receives the outgoing action command, the user identification, and the user instructions from the badge, connects the badge to a remote communication device based on the user identification, executes the outgoing action command and, if an incoming call is received, executes the user instructions.

2. The system of claim 1, wherein the central computer periodically determines locations of the badge based on which one of the access points is used to communicate with the badge.

3. The system of claim 1, wherein the user instructions comprises one or more of: an instruction to forward an incoming call, an instruction to take a message, and instruction to provide a message, an instruction to selectively block an incoming call, and an instruction to provide a unique notification of a certain incoming call.

4. The wireless communications system of claim 1, wherein the badge further comprises a pager receiver that receives communication signals while the badge is not within any of the coverage areas of any of the access points.

5. The wireless communications system of claim 1, wherein the central computer further comprises a computer network interface for communicating with the access points, a telephone interface for communicating with a telephone system, and a central processing unit that executes software code that implements the communications system.

6. The wireless communication system of claim 5, wherein the computer network is a local area network.

7. The wireless communications system of claim 1, wherein the central computer further comprises a computer network interface for communicating with the access points, a telephone interface for communicating with a telephone system and a system controller wherein the system controller further comprises a voice command interpreter that interprets the voice commands received by the badge to generate commands, a call manager, responsive to the commands from the voice command interpreter, that manages the incoming and outgoing telephone calls over the telephone system over the telephone interface, and a connection manager, responsive to the commands from the voice command interpreter, that manages the wireless communications with the access points.

8. The wireless communications system of claim 1, wherein the badge further comprises a wireless transceiver that communicates with the access point, a display unit for displaying text messages and menus to the user of the badge, and a user input device for entering commands and user instructions into the badge.

9. A wireless communications system, comprising:

a central computer;

one or more wireless access points connected to the central computer by a computer network, each access point having a coverage area;

a badge that communicates using a wireless protocol with one of the wireless access points that the badge is within the coverage area of, the badge further comprising a microphone that receives voice commands and spoken words from a user and a speaker that generates audible signals heard by the user; and wherein a communication session is initiated by a voice command from the user into the microphone of the badge and the communication session is carried out using the microphone and speaker of the badge, wherein the central computer further comprises an administrator that permits the badge to access the communications system and alter one or more configuration settings of the system.

10. A wireless communications system, comprising:

computer means for controlling the operation of the wireless communications system;

wireless access point means connected to the computer means by a computer network having one or more access points, each access point having a coverage area;

hands-free communications means that communicates using a wireless protocol with one of the wireless access points that the hands-free communications means is within the coverage area of, the hands-free communications means further comprising means for receiving voice commands from the user and means for generating audible signals heard by the user; and wherein a communication session is initiated by a voice command from the user into the receiver means of the hands-free communications means and the communication session is carried out using the receiver means and generator means of the hands-free communications means, wherein the computer means further comprises means for permitting a user to access the communications system and alter one or more configuration settings of the system.

11. A wireless communications unit for hands-free communication with a wireless communications system, the unit comprising:

a central processing unit that controls the operations of the unit;

a microphone which is connected to the central processing unit and receives voice commands about contacting a remote device and instructions regarding how to respond when contacted by a remote device;

a speaker connected to the central processing unit that generates audible signals heard by the user; and a wireless transceiver transmits the voice commands and the instructions to the wireless communication system using a wireless protocol.

12. The unit of claim 11 further comprising a display unit for displaying text messages and menus to the user of the unit.

13. The wireless communication unit of claim 11, wherein the instructions comprise one or more of: an instruction to forward an incoming call, an instruction to take a message, and instruction to provide a message, an instruction to selectively block an incoming call, and an instruction to provide a unique notification of a certain incoming call.

14. The wireless communication unit of claim 11, wherein the voice commands are a primary mode of sending signals to the communications system.

15. A wireless communications unit for hands-free communication with a wireless communications system, the unit comprising:

a central processing unit that controls the operations of the unit;

a microphone connected to the central processing unit that receives voice commands and spoken words from a user;

a speaker connected to the central processing unit that generates audible signals heard by the user;

a wireless transceiver connected to the central processing unit that communicates with the wireless communication system using a wireless protocol; and a pager receiver that permits the user to receive communication signals while the unit is not within any of the coverage areas of any of the access points;

wherein a communication session is initiated by a voice command from the user into the microphone of the unit and the telephone call is carried out using the microphone and speaker of the unit.

16. A wireless communications unit for hands-free communication with a wireless communications system, the unit comprising:

means for receiving voice commands and instructions from a user, wherein the voice commands are commands to contact a remote device and the instructions are instructions on how to respond when contacted by a remote device;

means for generating audible signals heard by the user;

means for controlling the operation of the receiving means and the generating means; and wireless communications means for forwarding the voice commands and the instructions to the wireless communication system using a wireless protocol.

17. The unit of claim 16 further comprising means for displaying text messages and menus to the user of the unit.

18. The wireless communication unit of claim 16, wherein the instructions comprise one or more of: an instruction to forward an incoming call, an instruction to take a message, and instruction to provide a message, an instruction to selectively block an incoming call, and an instruction to provide a unique notification of a certain incoming call.

19. The wireless communications unit of claim 16, wherein the voice commands are a primary mode of sending signals to the wireless communication system.

20. A wireless communications unit for hands-free communication with a wireless communications system, the unit comprising:

means for receiving voice commands and spoken words from a user;

means for generating audible signals heard by the user;

wireless communications means communicates with the wireless communication system using a wireless protocol;

means for controlling the operation of the receiving means, the generating means and the wireless communications means; and means for permitting the user to receive communication signals while the means for receiving is not within any of the coverage areas of any of the access points;

wherein a communication session is initiated by a voice command from the user into the microphone of the unit and the communication session is carried out using the microphone and speaker of the unit.

21. A communication system comprising:

a hands-free communication means for receiving an outgoing action command, a user identification, and user instructions on how to respond to incoming calls;

one or more access point means for communicating with the hands-free communication means through a wireless protocol, wherein each of the access points has a predetermined coverage area; and a computer means for receiving the outgoing action command, the user identification, and the user instructions from the hands-free communication means, connecting the hands-free communication means to another device based on the user identification and a database of user-to hands-free communication means assignments, executing the outgoing action command and, if an incoming call is received, executing the user instructions.

22. The system of claim 21, wherein the computer means periodically determines locations of the hands-free communication means based on which one of the access points is used to communicate with the hands-free communication means.

23. The wireless communications system of claim 21, wherein the hands-free communications means further comprises a pager receiver that receives communication signals while the hands-free communication means is not within any of the coverage areas of any of the access points.

24. The wireless communications system of claim 21, wherein the computer means further comprises means for communicating with the access points, means for communicating with a telephone system and a processor means for executing software code that implements the communications system.

25. The wireless communications system of claim 24, wherein the means for communicating with the access points is a local area network.

26. The wireless communications system of claim 21, wherein the computer means further comprises means further communication with a computer network for communicating with the access points, means for communicating with a telephone system and a system controller wherein the system controller further comprises means for interpreting the voice commands from a user of the first hands-free communications means to generate commands, means, responsive to the commands from the interpreter means, for managing the incoming and outgoing telephone calls over the telephone system, and means, responsive to the commands from the interpreter means, for managing the wireless communications with the access points.

27. The wireless communications system of claim 21, wherein the hands-free communications means further comprises a wireless transceiver that communicates with the access point, a display unit for displaying text messages and menus to the user of the hands-free communications means, and a user input device for entering commands into the hands-free communications means.

* * * * *